No. 824,047. PATENTED JUNE 19, 1906.
J. T. TAYLOR.
NUT LOCK.
APPLICATION FILED FEB. 12, 1906.
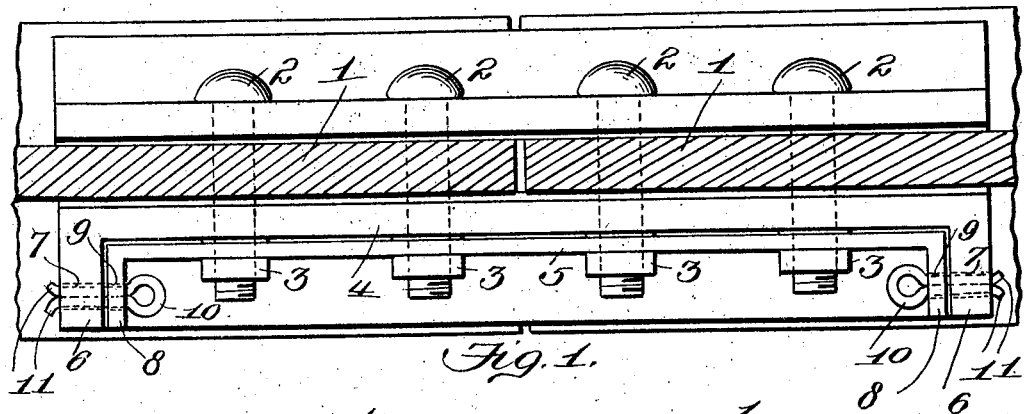
Fig. 1.
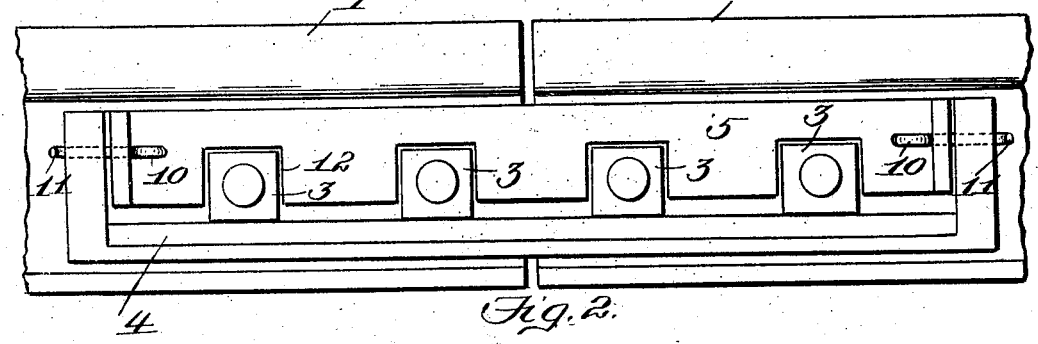
Fig. 2.
Fig. 3.
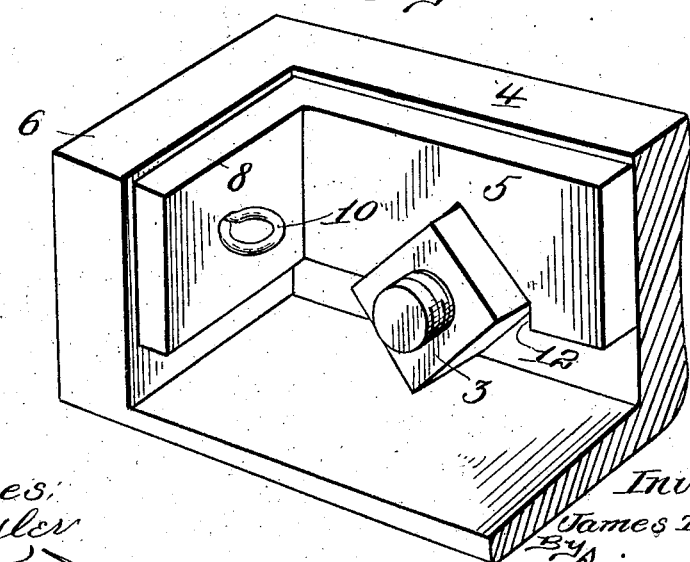
Witnesses:
C. D. Kesler
W. B. Keeler
Inventor
James T. Taylor
By James L. Norris
Atty

UNITED STATES PATENT OFFICE.

JAMES T. TAYLOR, OF FORT WORTH, TEXAS.

NUT-LOCK.

No. 824,047.    Specification of Letters Patent.    Patented June 19, 1906.

Application filed February 12, 1906. Serial No. 300,762.

*To all whom it may concern:*

Be it known that I, JAMES T. TAYLOR, a citizen of the United States, residing at Fort Worth, in the county of Tarrant and State of Texas, have invented new and useful Improvements in Nut-Locks, of which the following is a specification.

This invention relates to improvements in nut-locks of that type embodying a locking-plate for application to a series of nuts, and particularly those used in securing the joints of railroad rails, frogs, switches, and crossings, and coöperating with a fish-plate or analogous device.

The primary object of the invention is to provide a simple and effective means for securing a series of nuts by the application thereto of a plate or elongated locking member, which is formed with a series of openings or slots to receive the nuts after the latter have been turned or secured against a fish-plate, and to prevent removal of the locking-plate by securely attaching the same to the fish-plate in such a manner that a ready separation can be pursued when desired.

In the drawings, Figure 1 illustrates a top plan view of a railroad-rail joint, showing a fish-plate attached thereto and a locking-plate engaging the nuts and embodying the features of the invention. Fig. 2 is a side elevation of the same. Fig. 3 is a detail perspective view of one end of the locking-plate and fish-plate, showing a nut and a portion of a bolt arranged in operative relation thereto.

Similar numerals of reference are employed to indicate corresponding parts in the several views.

The numeral 1 designates rail-sections which are assembled in the usual manner for joint purposes and provided with suitable openings to receive headed bolts 2 with screw-threaded terminals, to which nuts 3 are applied and turned up close to a fish-plate 4 and secured against accidental loosening movement by a locking-plate 5.

The essential features of the invention reside in the fish-plate 4 and locking-plate 5, both plates being continuous with respect to the joint formed by the meeting ends of the rail-sections. The fish-plate 4 has at each end an outwardly-projecting angular offset or shoulder 6 with a key-opening 7 therethrough. The locking-plate 5 at each extremity has a corresponding angular end 8, with an opening 9 therein to coincide with the opening 7, the angular end 8 of the locking-plate 5 being closely fitted against the angular offset or shoulder 6 of the fish-plate when the locking-plate has been disposed in locking position with respect to the nuts 3. The locking-plate 5 is secured by a split spring-key 10, inserted through the openings 9 and 7, with the head thereof located against the inner side of the angular end 8 of the locking-plate and the ends of the legs outturned or separated, as at 11, adjacent to the outer surface of the offset or shoulder 6 of the fish-plate. The locking-plate 5 has a plurality of slots 12 formed therein, which may be square or polygonal, in accordance with the shape of the nuts 3, said slots 12 preferably opening through the bottom edge of the locking-plate 5 to permit the latter to be easily set over the nuts 3 after said nuts have been tightly secured against the fish-plate. It will be seen that when the locking-plate 5 is applied to the nuts 3 and secured at opposite terminals to the offsets or shoulders 6 of the fish-plate it will be impossible for the nuts to accidentally work loose or to move in view of vibration or pound of the rolling-stock on the rails; but when desired to repair the rails or substitute others for those that may have become worn and unfit for further use the split keys 10 may be readily removed and the locking-plate 5 detached to permit the nuts 3 to be run off the bolts 2.

The improved nut-lock is very simple in its construction, and the extent of the angular offset or shoulder of the fish-plate and the angular end of the locking-plate may be varied in accordance with the general dimensions of the two devices. It is preferred that the angular end of the locking-plate, as well as the shoulder or offset of the fish-plate, be at right angles to the parts with which they are intimately related, and said shoulders of the fish-plate and the angular end of the locking-plate may be formed at the time of preparing the two plates or may be employed with similar plates now in use by welding or riveting operations.

Having thus described the invention, what is claimed as new is—

1. The combination with a railroad-rail joint, and bolts and nuts therefor, of a fish-plate having outwardly-projecting end shoulders, a locking-plate having openings therein to fit over the nuts and angular terminals to snugly bear against the inner portions of the shoulders of the fish-plate, and removable keys inserted through the angular terminals of the locking-plate and the shoulders of the fish-plate.

2. In a nut-lock, the combination with abutting rail ends, and bolts and nuts, of a fish-plate having outwardly-projecting angular shoulders at opposite ends thereof with openings extending transversely therethrough, a locking-plate having slots therein to engage the nuts and also provided with angular terminals which are fitted closely against the inner sides of the shoulders, the angular terminals of the locking-plate having openings extending transversely therethrough coinciding with the openings of the shoulders of the fish-plate, and spring-keys inserted through the coinciding openings at the ends of the two plates, the heads of the keys being disposed inwardly against the angular terminals of the locking-plate and the ends thereof spread apart adjacent to the outer surfaces of the shoulders of the fish-plate.

In testimony whereof I have hereunto set my hand in presence of two subscribing witnesses.

JAMES T. TAYLOR.

Witnesses:
   JAS. VANARSDELL,
   WM. BARNES.